United States Patent Office 3,257,410
Patented June 21, 1966

3,257,410
N-PYRAZOYL ANTHRANILIC ACID DERIVATIVES AND THEIR SYNTHESIS
Rolf Pütter, Dusseldorf, Gerhard Wolfrum, Opladen, and Hans-Gerhard Hanke, Leverkusen, Germany, assignors to Farbenfabriken Bayer Aktiengesellschaft, Leverkusen, Germany, a corporation of Germany
No Drawing. Filed Mar. 2, 1961, Ser. No. 92,781
Claims priority, application Germany, Apr. 14, 1960, F 31,009
12 Claims. (Cl. 260—305)

The present invention relates to a new process for the production of arylamino pyrazoles with the use of oxazinones and hydrazines as starting materials.

Up to the present no processes for the production of arylamino pyrazoles according to the invention are known. The products obtainable according to the invention are new.

It is an object of the present invention to provide new compounds, i.e., arylamino pyrazoles as well as a new process for their production. A further object of the invention consists in providing a simple process for the production of arylamino pyrazoles which also gives satisfactory yields. Another object of the invention is the production of oxazinones required as starting materials. An especially important feature of the invention consists in that in the production of arylamino pyrazoles the preliminary products have not to be isolated, but that the reaction mixtures obtained can be directly used for the following reaction steps.

It has been found that arylamino pyrazoles of the general formula $$\text{Ar}_2 \begin{pmatrix} \text{NH} \\ \text{COOH} \end{pmatrix} \begin{matrix} \text{C}=\!=\!\text{CH} \\ | \quad \quad | \\ \text{R}_2\text{—N} \quad \text{C—R}_1 \\ \diagdown \quad \diagup \\ \text{N} \end{matrix} \quad \text{I}$$

wherein $Ar_2$ stands for an aromatic nucleus containing the carboxyl group and pyrazolylamino group in a position adjacent to one another, $R_1$ stands for an aliphatic or aromatic radical which may be substituted, and $R_2$ stands for an aliphatic, cycloaliphatic, aromatic-aliphatic, aromatic, or heterocyclic radical which may be substituted, can be obtained in a simple manner and in good yields by reacting, if necessary in the presence of a solvent, oxazinones of the general formula $$\text{Ar} \begin{pmatrix} \text{N}=\!=\!\text{C—CH}_2\text{—C—R}_1 \\ | \quad \quad \quad \| \\ \text{CO—O} \quad \quad \text{O} \end{pmatrix} \quad \text{II}$$

wherein Ar represents an aromatic nucleus of which two adjacent carbon atoms form part of the oxazine ring, and $R_1$ stands for the aforesaid radicals, with hydrazines of the general formula $$R_2HN\text{—}NH_2 \quad \quad \text{III}$$

wherein $R_2$ stands for the aforesaid radicals.

The course of the reaction is really surprising. It was not to be expected in any way that the reaction of the oxazinones with the hydrazines proceeds in such a manner that the oxazinones are split up and that arylamino pyrazoles are formed by condensation of the hydrazines through cyclisation.

The oxazinones to be used as starting materials become apparent from the Formula II and are described in greater detail by the examples.

These starting substances can be employed in the pure form as well as in the form of reaction mixtures directly obtained in the production method described below.

For carrying out the process according to the invention, mono-substituted hydrazines according to the Formula II may be taken into consideration as second reaction component. In this connection there may be mentioned: methyl hydrazine, cyclohexyl hydrazine, benzyl hydrazine, phenyl-hydrazine, phenyl hydrazine-sulphonic acids, nitrophenyl hydrazines chlorophenyl hydrazine, alkylphenyl hydrazines, α- and β-naphthyl hydrazines as well as benzthiazolyl hydrazine.

Water is advantageously used as solvent. However, organic solvents may also be employed. Examples of suitable solvents for this purpose are, alcohols such as methyl and ethyl alcohol, esters, ethers, lower aliphatic acids such as acetic acid, and solvents with a high dipole moment such as dimethyl formamide.

The process according to the invention is carried out at temperatures between 0 and 120° C., preferably between 20 and 80° C. One to two mols of hydrazine are used per mol of oxazinone. Since the reaction proceeds practically quantitatively, the use of equimolecular quantities is preferred.

Working up may be carried out in known manner and is advantageously effected by cooling the reaction mixture obtained and then filtering off with suction the precipitated crystallizate. In some cases it is expedient to complete the separation of the crystallizate by addition of water.

The compounds obtainable according to the invention and previously unknown may be used as intermediates for the synthesis of various end products. They are preferably used for the production of dyestuffs since they contain a coupling system. A representative example for the production of dyestuffs with the use of the arylamino pyrazoles according to the invention is given in Example 24.

The oxazinones according to Formula II used as starting substances are new, but may be produced in a simple manner.

Thus, these oxazinones may be obtained by heating o-carboxyaryl amides of β-ketocarboxylic acids of the formula $$\text{Ar}_1 \begin{pmatrix} \text{N—C—CH}_2\text{—C—R}_1 \\ | \quad \| \quad \quad \quad \| \\ \text{H} \quad \text{O} \quad \quad \text{O} \\ \diagdown \\ \text{COOH} \end{pmatrix} \quad \text{IV}$$

wherein $Ar_1$ denotes an aromatic nucleus containing the carboxyl group and the acylamino group in a position adjacent to one another, $R_1$ stands for an aliphatic or aromatic radical which may be substituted, and treating them, in the presence of a solvent, with agents splitting off water.

As agents splitting off water there may be taken into consideration, for example, phosphorus oxychloride, phosgene, di-isopropyl carbo-diimide and, in particular, acetic acid anhydride.

If the process is carried out with the use of agents splitting off water, the reaction temperatures lie advantageously betwen 40 to 180° C., preferably between 70 to 120° C.

If the ring closure is brought about by simple heating, the process is carried out a temperatures between 80 to 250° C., preferably 100 to 200° C.

1 to 1.5 mol of an agent splitting off water are used per mol of the o-carboxy-aryl amides of the β-keto carboxylic acids. The operation is advantageously performed with approximately equimolecular quantities.

Working up is effected according to known processes and is especially carried out in such a manner that the reaction mixture is cooled and the separated product filtered off with suction.

As solvents for this process there may be used chlorinated hydrocarbons such as carbon tetrachloride and chlorobenzenes as well as aromatic hydrocarbons and higher boiling benzines.

If the production of the oxazinones is started from o-carboxyaryl amides according to the Formula IV, in which $R_1$ stands for a methyl group, the latter may be produced in a simple manner by reacting diketenes with aromatic o-aminocarboxylic acids. Also in this case it is possible not to employ pure o-carboxyaryl amides, but the reaction mixtures obtained in the reaction of diketenes with aromatic o-aminocarboxylic acid. It is, therefore, not necessary to isolate the o-carboxylaryl amides according to the Formula IV.

The following examples are given for the purpose of illustrating the invention without limiting it, the parts being parts by weight.

*Example 1*

20.3 parts of acetonyl benzoxazinone of the formula

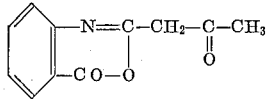

are added at 10° C. to a solution of 14.5 parts of phenyl hydrazine hydrochloride in 200 parts of water containing a few drops of a dispersing agent solution. The mixture is then treated within 1 hour with 50 parts of a 20% sodium carbonate solution and heated at 70° C. for 10 minutes; the nearly clear solution thus formed is filtered and rendered acid with about 11.9 parts of hydrochloric acid (d. 1.19) until the reaction is weakly acid to Congo. The crystalline precipitate formed is filtered off and dried. 20 parts of a reaction product of melting point 213° C. are obtained. Analysis of this product: C, 69.39%; H, 5.13%; and N, 14.20% well agrees with the calculated values of the compound

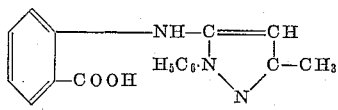

(C, 69.61%; H, 5.15%; and N, 14.33%).

The acetonyl benzoxazinone used as starting material can be obtained in the following manner:

137 parts of anthranilic acid in 600 parts of carbon tetrachloride are heated under reflux to 70° C. and 84 parts of diketene are run into the solution within 30 minutes. The initially clear solution solidifies to a thick crystal slurry, and the temperature of the mixture rises to the boiling point of the solvent. The mixture is kept at boiling temperature for a further 20 minutes and then treated with 110 parts of acetic acid anhydride within a few minutes. A clear solution is again formed which is heated for a further hour, then cooled to +5° C. and the resultant crystalline precipitate filtered off, washed with ligroin and dried. 145 parts of acetonyl benzoxazinone of melting point 121–122° C. are obtained.

The same product can also be obtained in the following manner:

137 parts of anthranilic acid are dissolved in 600 parts of water and 102 parts of a sodium hydroxide solution (d. 1.46) and treated with 84 parts of diketene while cooling. As soon as no further anthranilic acid can be detected, phosgene is introduced with cooling to 0–10° C. into the solution of the acetoacetyl anthranilic acid, and simultaneously sufficient sodium carbonate is added dropwise to keep the reaction continuously weakly alkaline (pH 7.5 to 9). The reaction product slowly precipitating in crystalline form is filtered off and washed with water.

*Example 2*

118 parts of oxazinone of the formula

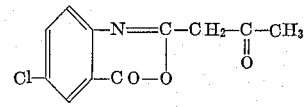

are introduced into a solution of 72 parts of phenyl hydrazine hydrochloride in 1500 parts of water, and 500 parts of a 20% sodium carbonate solution are then added dropwise to the mixture within one hour. The mixture is heated to 70° C. for a further 10 minutes then cooled and rendered acid. The precipitated yellow crystals thus obtained are filtered off with suction and dried. 162 parts of a compound of melting point 249–251° C. are obtained corresponding to the formula

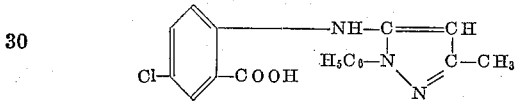

The oxazinone used as starting material can be obtained in the following manner:

By the dropwise addition of 168 parts of diketene to a solution of 342 parts of 5-chloro-2-amino-benzoic acid in 1400 parts of water and 80 parts of sodium hydroxide there are obtained according to the instructions of Example 1 470 parts of 2-(acetoacetyl-amino) - 5 - chlorobenzoic acid of melting point 152–153° C. By the reaction of 255 parts of this compound in 780 parts of o-dichlorobenzene with 110 parts of acetic acid anhydride, 210 parts of the aforesaid oxazinone of melting point 157–159° C. are thus obtained.

*Example 3*

126 parts of acetonyl naphthoxazinone of the formula

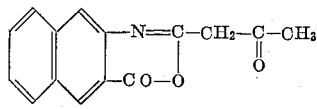

are added to a solution of 72 parts of phenyl hydrazine hydrochloride in 1000 parts of water containing a few drops of a dispersing solution. The mixture is then treated within 1 hour with 250 parts of a 20% sodium carbonate solution and heated at 70° C. for a further 10 minutes. After cooling, the reaction mixture is rendered weakly acid to Congo with hydrochloric acid, and the yellow crystalline precipitate formed filtered off and dried. 163 parts of a reaction product of melting point 258–259° C. are obtained. Analysis of the product: C, 73.34%; H, 5.29%, and N, 12.36% well agrees with the calculated values of the compound

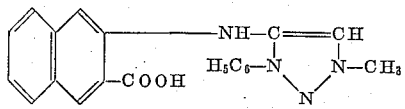

(C, 73.45%; H, 4.99%, and N, 12.24%).

The oxazinone used as starting material can be obtained in the following manner:

187 parts of 2-aminonaphthalene-carboxylic acid-(3) are dissolved in 40 parts of sodium hydroxide in 900 parts of water and slowly treated at 30° C. while cooling with 84 parts of diketene. As soon as the reaction is completed, the reaction product is precipitated by addition of 107 parts of hydrochloric acid (d. 1.19), then filtered off with suction and washed with water. Upon recrystallisation from methanol/water, 210 parts of 2-(acetoacetyl-amino)-naphthalene-carboxylic acid-(3) of melting point 186–187° C. are obtained. 135 parts of this compound are heated to 100° C. in 780 parts of o-dichlorobenzene and treated dropwise within 10 minutes with 55 parts of acetic anhydride.

The reaction mixture is kept at the same temperature for a further 3 hours whereby a clear solution is obtained. The solution is then cooled to +5° C. and the precipitated yellow crystals are filtered off with suction. 105 parts of the above acetonyl naphthoxazinone of melting point 148–150° C. are thus obtained.

*Example 4*

90 parts of β-cyanethyl hydrazine are dissolved in a mixture of 900 parts of water and 105 parts of 36% hydrochloric acid, and 203 parts of acetonyl benzoxazinone described in Example 1 are added to this solution with good stirring. 600 parts of a 20% sodium carbonate solution are then added dropwise within 2 hours and the mixture is then stirred at room temperature for a further 3–4 hours. During this time the total amount of acetonyl benzoxazinone dissolves. The small quantity of undissolved portions is filtered off and the clear filtrate adjusted to a pH value of about 6 with dilute hydrochloric acid or acetic acid. The precipitated reaction product thus obtained is filtered off, washed with water and dried. 205 parts of a compound of melting point 199–200° C. are obtained to which the formula

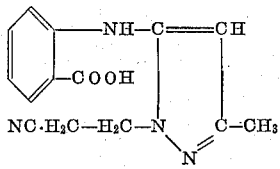

is to be ascribed.

*Example 5*

20.3 parts of the acetonyl benzoxazinone described in Example 1 are added at 10° C. with stirring to a weakly acid solution of 18.8 parts of phenyl hydrazine sulphonic acid-(4) in 200 parts of water containing a few drops of a wetting agent solution. The initially undissolved oxazinone slowly dissolves and after some time a crystalline precipitate is again formed. The reaction mixture is stirred for a further 2 hours, then heated to 70° C. and treated with about 10 parts of a sodium hydroxide solution (d. 1.46) until the reaction is distinctly alkaline to phenol phthalein. The alkaline solution is kept at 70° C. for a further 30 minutes and then treated with 30 parts of common salt. After cooling, the crystalline precipitate is filtered off and dissolved in 500 parts of hot water; the solution is clarified with active charcoal and treated with 25 parts of hydrochloric acid. The reaction product precipitates in the form of white crystals. After cooling, the crystals are filtered off with suction, washed repeatedly with water and finally dried. Analysis of the compound obtained: C, 54.30%; H, 4.53%; N, 11.1%, and S, 8.4% well agrees with the calculated values of the compound of the formula

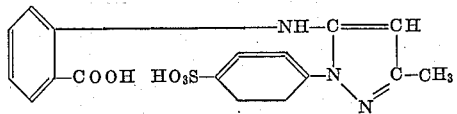

(C, 54.69%; H, 4.05%; N, 11.26%, and S, 8.56%).

*Example 6*

247 parts of acetonyl benzoxazinone of the formula

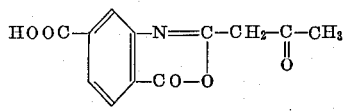

are added to a solution of 144 parts of phenyl hydrazine hydrochloride in 2100 parts of water. The mixture is treated within 45 minutes with 500 parts of a 20% sodium carbonate solution and then heated to 70° C. for a further 10 minutes. After cooling, the reaction mixture is rendered weakly acid to Congo with hydrochloric acid, and the precipitated yellow crystalline substance filtered off with suction, washed with water and dried. 317 parts of a reaction product of melting point 267–270° C. are obtained. Analysis of this substance: C, 63.80%; H, 4.75%, and N, 12.22% well agrees with the calculated values of the compound

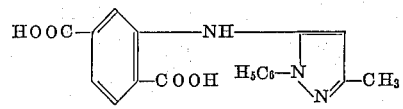

(C, 64.09%; H, 4.48%, and N, 12.46%).

The oxazinone of the above formula used as starting product can be obtained by the reaction of aminoterephthalic acid with diketene and subsequent splitting off of water from the resultant N-acetacetyl compound with acetic acid anhydride or phosgene.

*Example 7*

95 parts of methyl hydrazine sulphate are dissolved in 200 parts of water and 203 parts of the acetonyl benzoxazinone described in Example 1 are added with stirring. 800 parts of a 20% sodium carbonate solution are then added dropwise within 1–2 hours, and the mixture is stirred at room temperature for 6–8 hours. Nearly the whole acetonyl benzoxazinone is then dissolved. A small amount of undissolved portions is filtered off and the clear filtrate rendered weakly acid with hydrochloric acid. The compound crystallises out and is filtered off, washed with water and dried. 125 parts of a compound of melting point 212–213° C. are obtained. Analysis of this substance (C, 62.65%; H, 6.01%; O, 14.03%, and N, 17.94%) well agrees with the calculated values (C, 62.32%; H, 5.67%; O, 13.84%, and N, 18.17%) of the compound of the formula

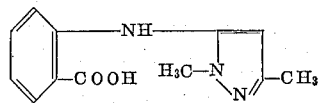

*Example 8*

160 parts of a hydrazine of the formula

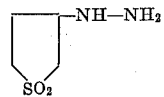

are dissolved in 1000 parts of glacial acetic acid, and 203 parts of the acetonyl benzoxazinone described in Example 1 are added to the solution. The start of the reaction is recognisable by a slight temperature rise, and the reaction is completed by stirring at 40–50° C. for two hours. The clear brown solution is then run into 5000 parts of water with good stirring and the precipitated colourless compound is filtered off, washed with water and dried. 280 parts of a reaction product of melting point 232–233° C. are obtained. The analysis values of the compound (C, 53.45%; H, 5.04%; O, 19.22%, N, 12.52%, and S, 9.70%) fairly correspond with the values calculated for the compound of the formula

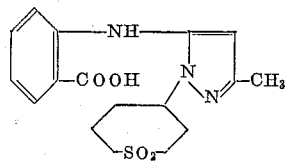

(C, 53.73%; H, 5.11%; O, 19.09%; N, 12.53%, and S, 9.54%).

Example 9

165 parts of 2-hydrazino-benzthiazole are dissolved in 2500 parts of glacial acetic acid, and 203 parts of the acetonyl-benzoxazinone described in Example 1 are added with stirring. The oxazinone dissolves completely clear after a short time, but after about 10 minutes a new compound crystallises out with a slight rise in temperature. The reaction mixture is first stirred at room temperature for two hours, then at 40–50° C. for a further 1–2 hours followed by diluting with 2500 parts of water. The reaction product obtained is filtered off with suction, washed repeatedly with water, dried and finally recrystallised from a benzene/methanol mixture. 200 parts of a compound melting at 272–273° C. are obtained. Analysis of the compound: C, 61.80%; H, 4.17%; O, 9.35%; N, 15.97%, and S, 9.20% well agrees with the values calculated for the compound of the formula

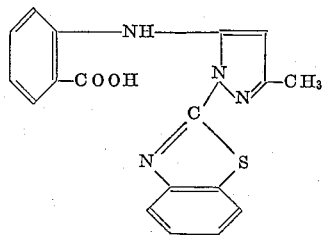

(C, 61.71%; H, 4.03%; O, 9.14%; N, 16.00%, and S, 9.14%).

When in this example instead of 165 parts of 2-hydrazino-benzthiazole there are used 187 parts of phenyl-hydrazine-4-sulphonamide, o-carboxyphenyl-aminopyrazole of the formula

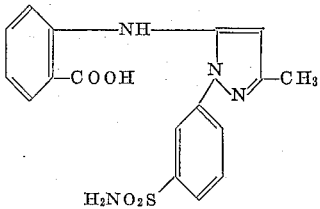

of melting point 272–276° C. is obtained in good yield.

Example 10

137 parts of anthranilic acid are stirred in 400 parts of acetic acid and heated to 70° C. 95 parts of diketene are slowly added dropwise at the same temperature. After stirring for one hour, 155 parts of acetic acid anhydride are run into the mixture which is heated at 80–85° C. for a further 2 hours. Into the suspension of acetonyl-benzoxazinone cooled to room temperature there are added 200 parts of 2,4-dinitrophenyl hydrazine and 200 parts of acetic acid, and the mixture is heated at 80° C. for 3 hours. After cooling, the arylamino pyrazole is precipitated either by evaporating off part of the acetic acid or by pouring into an equal volume of water. 348 parts of a reaction product of melting point 178–179° C. are obtained. Analysis of this product: C, 53.36%; H, 3.35%; N, 18.39%, and O, 25.21%, well agrees with the calculated values C, 53.26%; H, 3.42%; N, 18.27%, and O, 25.05%, for the compound of the formula

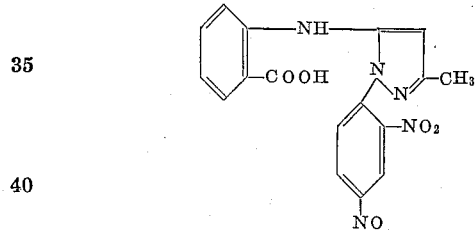

In analogous manner there are obtained by replacing 2,4-dinitrophenyl hydrazine by equimolecular amounts of other hydrazines, the following compounds

| No. | Formula | Melting Point, degrees | | Analysis, percent | | | | |
|---|---|---|---|---|---|---|---|---|
| | | | | C | H | Cl | N | O |
| (11) | (structure with -NH-, -COOH, pyrazole-CH₃, -CH₂CH₂OH) | 210–211 | Calc<br>Found | 59.76<br>59.91 | 5.79<br>5.95 | | 16.08<br>15.98 | 18.37<br>18.21 |
| (12) | (structure with -NH-, -COOH, pyrazole-CH₃, H₃C-CH-CH₃) | 206–208 | Calc<br>Found | 64.84<br>65.03 | 6.61<br>6.80 | | 16.21<br>16.14 | 12.34<br>12.51 |
| (13) | (structure with -NH-, -COOH, pyrazole-CH₃, cyclohexyl) | 210–212 | Calc<br>Found | 68.20<br>68.15 | 7.07<br>6.95 | | 14.04<br>14.01 | 10.69<br>10.86 |

| No. | Formula | Melting Point, degrees | Analysis, percent | | | | | |
|---|---|---|---|---|---|---|---|---|
| | | | | C | H | Cl | N | O |
| (14) | phenyl-NH-pyrazole(CH3)(cyclopentyl), COOH | 162-164 | Calc<br>Found | 67.34<br>67.13 | 6.71<br>6.80 | -------<br>------- | 14.73<br>14.79 | 11.21<br>11.41 |
| (15) | phenyl-NH-pyrazole(CH3)(CH2-phenyl), COOH | 192-193 | Calc<br>Found | 70.34<br>70.19 | 5.58<br>5.70 | -------<br>------- | 13.67<br>13.56 | 10.41<br>10.62 |
| (16) | phenyl-NH-pyrazole(CH3)(CH2-naphthyl(SO3Na)2), COOH | -------- | Calc<br>Found | 46.1<br>45.82 | 2.76<br>2.59 | -------<br>------- | 7.69<br>7.73 | 23.4<br>23.21 |
| (17) | Cl-phenyl-NH-pyrazole(CH3)(2,4-dinitrophenyl), COOH | 221-223 | Calc<br>Found | 48.9<br>49.03 | 2.8<br>2.96 | 8.49<br>8.5 | 16.84<br>16.67 | 22.96<br>22.89 |
| (18) | Cl-phenyl-NH-pyrazole(CH3)(2-pyridyl), COOH | 252-254 | Calc<br>Found | 58.5<br>58.31 | 3.98<br>4.03 | 10.78<br>10.8 | 17.05<br>16.91 | 9.73<br>9.92 |
| (19) | Cl-phenyl-NH-pyrazole(CH3)(cyclopentyl), COOH | 198-200 | Calc<br>Found | 60.02<br>60.05 | 5.69<br>5.66 | 11.1<br>11.05 | 13.17<br>13.14 | 10.1<br>10.38 |
| (20) | CH3-phenyl-NH-pyrazole(CH3)(cyclopentyl), COOH | 202-204 | Calc<br>Found | 68.20<br>68.18 | 7.07<br>6.99 | -------<br>------- | 14.04<br>13.87 | 10.69<br>10.58 |

| No. | Formula | Melting Point, degrees | Analysis, percent | | | | |
|---|---|---|---|---|---|---|---|
| | | | | C | H | Cl | N | O |
| (21) | (structure) | 257-260 | Calc | 58.20 | 3.49 | | 16.16 | 22.15 |
| | | | Found | 58.24 | 3.43 | | 16.21 | 22.04 |
| (22) | (structure) | 246-248 | Calc | 50.98 | 4.61 | | 18.29 | 26.12 |
| | | | Found | 51.62 | 4.79 | | 18.04 | 26.33 |
| (23) | (structure) | 194-196 | Calc | 58.17 | 5.49 | | 16.96 | 19.37 |
| | | | Found | 57.98 | 5.58 | | 16.81 | 19.45 |

Example 24

Preparation of azo dyestuffs from the pyrazoles according to the invention:

37.3 parts of 2-(4'-sulphophenyl)-3-methyl-5-(2''-carboxyphenylamino)-pyrazole are dissolved neutral in 300 parts of water and treated with a diazonium chloride solution obtained in conventional manner from 15.6 parts of 2-amino-5-nitro-anisole. The mixture is adjusted to a pH of 3 with a sodium acetate solution and stirred at room temperature for 24 hours. The azo compound of the formula given below is then filtered off. After drying and grinding it is a brown powder which dyes wool from an acetic acid bath in red-brown shades. When the dyeing process is followed by a treatment with alkali metal chromate, the shade changes to blue-green.

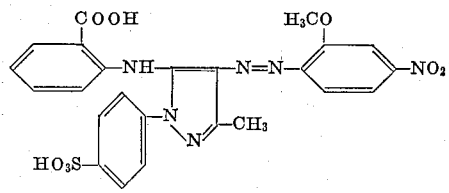

In analogous manner, corresponding azo dyestuffs may be obtained from the pyrazoles according to the invention and other suitable diazonium compounds

Example 25

26.5 parts of benzoxazinone of the formula

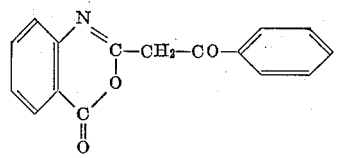

are added at a temperature of 20 to 25° C. and while stirring to a solution of 11 parts phenylhydrazine in 200 parts of acetic acid. The temperature rises and after a short time the oxazinone is completely dissolved. The reaction mixture is stirred at a temperature of 40 to 50° C. for another 2 hours. At the end of that period of time the larger portion of the reaction product crystallises out. After cooling 300 parts of water are added to the reaction mixture in order to complete the precipitation of the reaction product. The whole mixture is cooled to 0°C. The reaction product is isolated by filtration. It is washed several times with water and dried. 32.3 parts of a compound according to the formula below are obtained. Melting point 180–181° C.

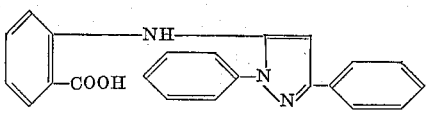

*Analysis.*—Calc.: C, 74.35; H, 4.82; N, 11.84; O, 9.00. Found: C, 74.17; H, 477; N, 11.71; O, 8.89.

The benzoxazinone used as starting material in the above reaction can be obtained in the following manner:

137 parts of anthranilic acid, 200 parts of benzoyl-acetic acid ester and 700 parts of xylene are refluxed for 4 hours. After that period of time 200 parts of solvent are distilled off in about 2 hours. The remaining reaction mixture is then cooled to 0° C. while stirring and stirred at this temperature for a couple of hours. The precipitated reaction product which is crystalline is filtered by suction. It is washed with benzene and recrystallised from benzene and dried. 170 parts of benzoyl-acetic acid anthranilide are obtained. Melting point 168–169° C. 28.3 parts of benzoylacetic acid anthranilide and 250 parts of carbontetrachloride are heated to the boiling point while stirring. 15 parts of acetic acid anhydride are added. The mixture is boiled under reflux for about 1 hour and a clear solution is obtained, which is refluxed for still another hour. Upon cooling the benzoxazinone used as starting material is precipitated in crystalline form. 23.4 parts are obtained. Melting point 140–141° C.

Example 26

26.5 parts of a benzoxazinone of the formula

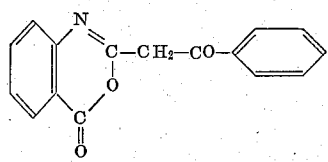

(prepared as described in the foregoing example) are added at a temperature of 20 to 25° C. and while stirring to a solution of 16 parts of 3-hydrazino-tetramethylene-sulfone in 200 parts of acetic acid. The reaction and the working up is carried out in the same way as described in the foregoing example.

36.2 parts of a compound according to the following formula are obtained

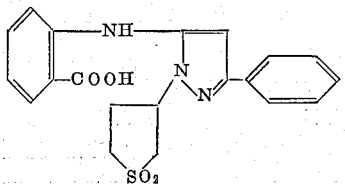

Melting point 199–200° C.

*Analysis.*—Calc.: C, 60.45; H, 4.82; N, 10.58; S, 8.05. Found: C, 60.23; H, 4.94; N, 10.65; S, 8.14.

We claim:

1. An arylaminopyrazole having the formula

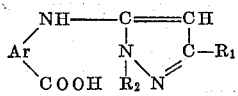

wherein Ar is an aromatic nucleus containing a carboxylic group and a pyrazolylamino group in the ortho position selected from the group consisting of phenylene, naphthylene, methylphenylene, chlorophenylene, phenylene carboxylic acid and nitrophenylene, and $R_1$ is a member selected from the group consisting of lower alkyl and phenyl, and $R_2$ is a member selected from the group consisting of lower alkyl, lower alkyl phenyl, lower hydroxy alkyl, lower cyanoalkyl, sulfonic acid phenyl, 3-tetrahydrothienyl - 1,1 - dioxide, benzthiazolyl, sulfonamido phenyl, nitrophenyl, sulfonic acid naphthyl, cyclopentyl and pyridyl.

2. A compound of the formula

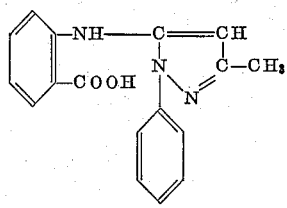

3. A compound of the formula

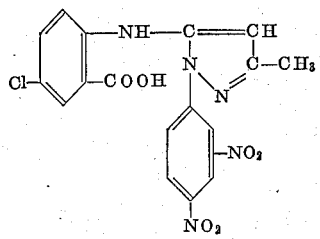

4. A compound of the formula

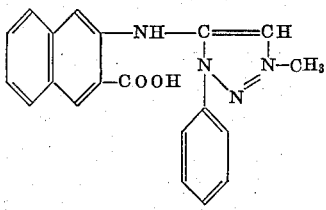

5. A compound of the formula

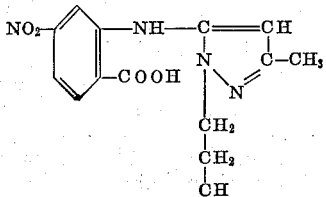

6. A compound of the formula

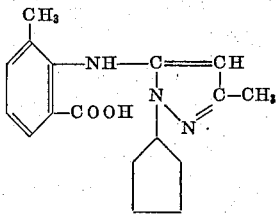

7. A compound of the formula

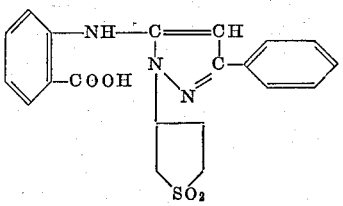

8. A compound of the formula

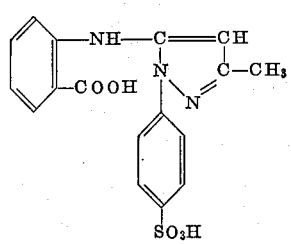

9. A compound of the formula

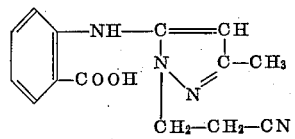

10. A compound of the formula

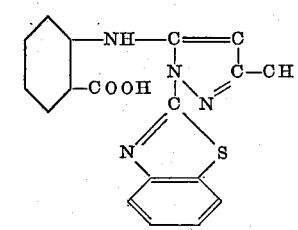

11. A process for the production of arylaminopyrazoles, which comprises reacting an oxazinone of the formula

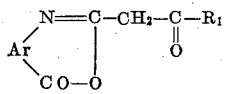

wherein Ar is an aromatic nucleus selected from the group consisting of phenylene, naphthylene, methylphenylene, chlorphenylene, phenylene carboxylic acid, and nitrophenylene, and $R_1$ is a member selected from the group consisting of lower alkyl and phenyl with hydrazine of the formula

wherein $R_2$ is a member selected from the group consisting of lower alkyl, lower alkyl phenyl, lower hydroxy alkyl, lower cyanoalkyl, sulfonic acid phenyl, 3-tetrahydrothienyl-1,1-dioxide, benzthiazolyl, sulfonamidophenyl, nitrophenyl, sulfonic acid naphthyl, cyclopentyl and pyridyl in a molar ratio of oxazinone to hydrazine within the range of between 1:1 to 1:2 under the reaction conditions including an inert solvent and a temperature of between $+20°$ and $+80°$ C. and thereafter recovering the arylaminopyrazole formed.

12. A process for the production of arylaminopyrazoles, which comprises the steps of heating an ortho-carboxyaryl amide of a β-ketocarboxylic acid of the formula

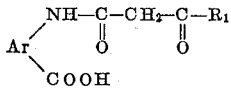

wherein Ar is an aromatic nucleus containing a carboxyl group in the ortho position to the NH— group selected from the group consisting of phenylene, naphthylene, methylphenylene, chlorphenylene, phenylene carboxylic acid and nitrophenylene, and $R_1$ is a member selected from the group consisting of lower alkyl and phenyl in the presence of an inert organic solvent and of an agent for splitting off water selected from the group consisting of acetic acid anhydride, phosphorus oxychloride, phosgene and di-isopropyl carbodiimide at a temperature of between $+40$ and $±80°$ C., recovering the oxazinone thereby formed, reacting said oxazinone with a hydrazine of the formula

wherein $R_2$ is a member selected from the group consisting of lower alkyl, lower alkyl phenyl, lower hydroxy alkyl, lower cyanoalkyl, sulfonic acid phenyl, 3-tetrahydrothienyl-1,1-dioxide, benzthiazolyl, sulfonamidophenyl, nitrophenyl, sulfonic acid naphthyl, cyclopentyl and pyridyl in a molar ratio of oxazinone to hydrazine within the range of between 1:1 to 1:2 under the reaction conditions including an inert solvent and a temperature of between $+20°$ and $+80°$ C. and thereafter recovering the arylaminopyrazole formed.

References Cited by the Examiner

UNITED STATES PATENTS

| | | | |
|---|---|---|---|
| 1,951,807 | 3/1934 | Preiswerk et al. | 260—244 |
| 2,633,466 | 3/1953 | Wallingford | 260—244 |
| 2,975,188 | 3/1961 | Gold et al. | 260—310 |
| 2,989,539 | 6/1961 | Anderson et al. | 260—310 |
| 3,041,342 | 6/1962 | Jucker et al. | 260—310 |

HENRY R. JILES, *Acting Primary Examiner.*

IRVING MARCUS, D. T. McCUTCHEN, *Examiners.*

R. J. GALLAGHER, *Assistant Examiner.*

UNITED STATES PATENT OFFICE
CERTIFICATE OF CORRECTION

Patent No. 3,257,410                                       June 21, 1966

Rolf Pütter et al.

It is hereby certified that error appears in the above numbered patent requiring correction and that the said Letters Patent should read as corrected below.

Column 1, lines 33 to 35, the formula should appear as shown below instead of as in the patent:

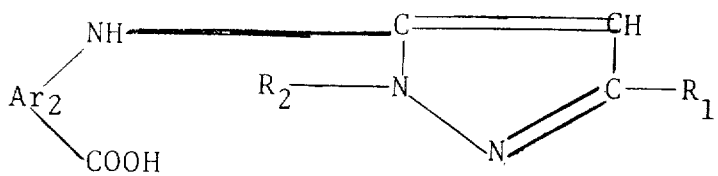

column 3, line 4, for "a" read -- at --; line 26, for "o-carboxylaryl" read -- o-carboxyaryl --; lines 53 to 56, the formula should appear as shown below instead of as in the patent:

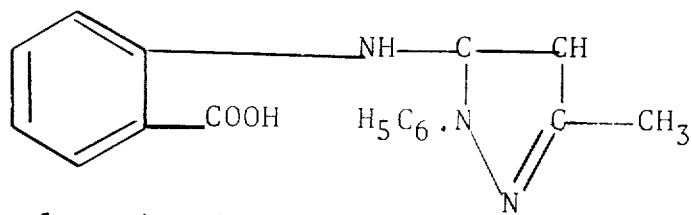

column 4, lines 65 to 69, the formula should appear as shown below instead of as in the patent:

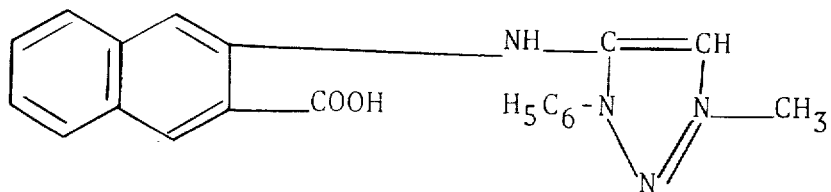

column 5, lines 70 to 73, the formula should appear as shown below instead of as in the patent:

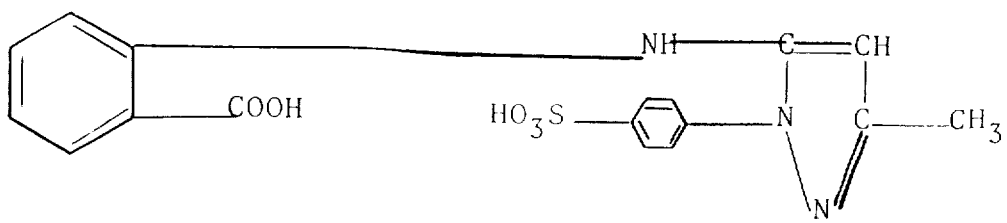

3,257,410 column 7, lines 4 to 9, the formula should appear as shown below instead of as in the patent:

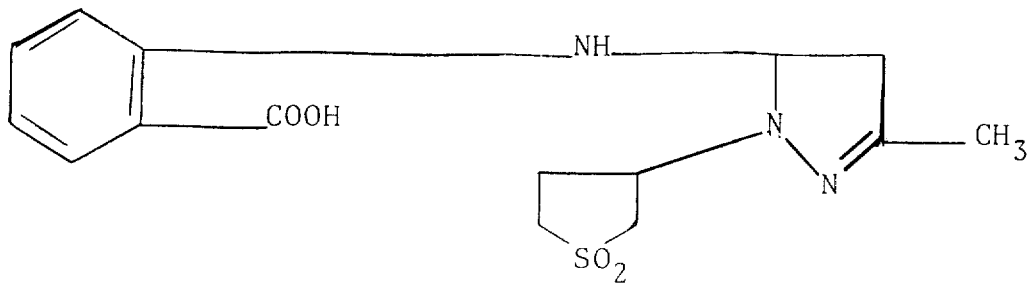

line 28, for "C,61.80%" read -- (C, 61.80% --; line 29, for "S, 9.20%" read -- S, 9.20%) --; column 8, lines 33 to 41, for that portion of the formula reading

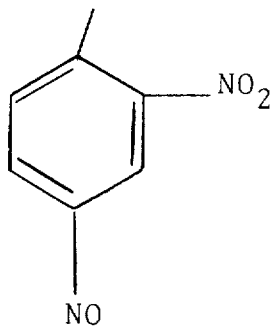   read   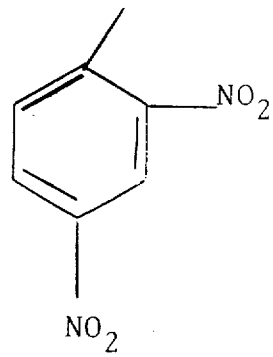

column 12, line 55, for "H, 477" read -- H 4.77 --.

Signed and sealed this 15th day of August 1967.

(SEAL)
Attest:

EDWARD M. FLETCHER, JR.
Attesting Officer

EDWARD J. BRENNER
Commissioner of Patents